US009708523B2

(12) United States Patent
Allison et al.

(10) Patent No.: US 9,708,523 B2
(45) Date of Patent: Jul. 18, 2017

(54) SWELLABLE SPACER FLUIDS AND ASSOCIATED METHODS

(75) Inventors: David B. Allison, Duncan, OK (US);
Rickey L. Morgan, Duncan, OK (US);
Melissa G. Allin, Comanche, OK (US);
Larry S. Eoff, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 559 days.

(21) Appl. No.: 12/606,344

(22) Filed: Oct. 27, 2009

(65) Prior Publication Data

US 2011/0094746 A1 Apr. 28, 2011

(51) Int. Cl.
E21B 43/16 (2006.01)
C09K 8/40 (2006.01)
C09K 8/42 (2006.01)

(52) U.S. Cl.
CPC ............ C09K 8/40 (2013.01); C09K 8/424 (2013.01)

(58) Field of Classification Search
CPC .......... E21B 43/16; E21B 43/26; E21B 43/25; E21B 43/267
USPC .... 166/305.1, 308.1, 308.5, 308.2, 285, 300
See application file for complete search history.

(56) References Cited

U.S. PATENT DOCUMENTS

| 3,385,367 A | 5/1968 | Kollsman |
| 4,141,843 A | 2/1979 | Watson |
| 4,217,229 A | 8/1980 | Watson |
| 4,797,158 A * | 1/1989 | Harriett .................... 106/629 |
| 5,149,370 A | 9/1992 | Olaussen et al. |
| 5,789,352 A * | 8/1998 | Carpenter ............. C09K 8/601 166/291 |
| 5,836,392 A | 11/1998 | Urlwin-Smith |
| 5,921,317 A * | 7/1999 | Dewprashad et al. ..... 166/280.1 |
| 6,192,986 B1 | 2/2001 | Urlwin-Smith |
| 6,196,317 B1 | 3/2001 | Hardy |
| 6,258,757 B1 * | 7/2001 | Sweatman et al. ........... 507/219 |
| 7,059,415 B2 | 6/2006 | Bosma et al. |
| 7,114,568 B2 | 10/2006 | Eoff et al. |
| 7,143,827 B2 | 12/2006 | Chatterji et al. |
| 7,143,832 B2 | 12/2006 | Freyer |
| 7,207,387 B2 | 4/2007 | Eoff et al. |
| 7,293,609 B2 | 11/2007 | Dealy et al. |
| 7,341,106 B2 | 3/2008 | Reddy et al. |
| 7,478,675 B2 | 1/2009 | Roddy et al. |
| 7,488,705 B2 * | 2/2009 | Reddy et al. ................. 507/219 |
| 7,527,099 B2 | 5/2009 | Bosma et al. |
| 7,572,501 B2 | 8/2009 | Li et al. |
| 7,578,347 B2 | 8/2009 | Bosma et al. |
| 7,607,482 B2 | 10/2009 | Roddy et al. |
| 7,607,484 B2 | 10/2009 | Roddy et al. |
| 7,617,870 B1 | 11/2009 | Roddy et al. |
| 7,717,180 B2 * | 5/2010 | Badalamenti et al. ....... 166/292 |
| 2001/0018972 A1 * | 9/2001 | Bayliss et al. ................ 166/292 |
| 2004/0020662 A1 | 2/2004 | Freyer |
| 2005/0061206 A1 | 3/2005 | Reddy et al. |
| 2005/0113260 A1 | 5/2005 | Wood |
| 2005/0199401 A1 | 9/2005 | Patel et al. |
| 2006/0122071 A1 * | 6/2006 | Reddy et al. ................. 507/219 |
| 2006/0162930 A1 * | 7/2006 | Gronsveld et al. ........... 166/293 |
| 2007/0137528 A1 | 6/2007 | Le Roy-Delage et al. |
| 2007/0169937 A1 * | 7/2007 | Allin et al. ................... 166/295 |
| 2007/0204765 A1 | 9/2007 | Le Roy-Delage et al. |
| 2007/0246225 A1 | 10/2007 | Hailey, Jr. et al. |
| 2007/0257405 A1 | 11/2007 | Freyer |
| 2008/0017376 A1 * | 1/2008 | Badalamenti et al. ....... 166/292 |
| 2008/0099203 A1 | 5/2008 | Mueller et al. |
| 2008/0108524 A1 | 5/2008 | Willberg et al. |
| 2008/0261834 A1 | 10/2008 | Simon |
| 2009/0032260 A1 | 2/2009 | Schultz et al. |
| 2010/0016183 A1 * | 1/2010 | Roddy .................... C04B 20/10 507/225 |

FOREIGN PATENT DOCUMENTS

WO WO2005116394 A1 12/2005

OTHER PUBLICATIONS

Hardy, Mary, New Organically Crosslinked Polymer System Provides Competent Propagation at High Temperature in Conformance Treatments, SPE 39690, 1998, pp. 1-12, Society of Petroleum Engineers, Inc.
Halliburton Brochure entitled H2Zero™ Service, Cost-Effective Conformance Control, 2008.
Halliburton Brochure entitled HZ10™ Polymer, 2007.
Halliburton Brochure entitled HZ-20™ Crosslinker, 2008.
Dalrymple, Shallow Penetration Particle-Gel System for Water and Gas Shutoff Applications, SPE 114886, pp. 1-7, Russian Oil & Gas Technical Conference and Exhibition held in Moscow, Russia Oct. 28-30, 2008.
Eoff, Worldwide Field Applications of a Polymeric Gel System for Conformance Applications, SPE 98119, 2008, pp. 1-6, Society of Petroleum Engineers.
Cavanagh, Self-Healing Cement—Novel Technology to Achieve Leak-Free Wells, SPE/IADC 105781, pp. 1-13, SPC/ADC Drilling Conference, held in Amsterdam, The Netherlands, Feb. 20-22, 2007.

(Continued)

*Primary Examiner* — Silvana Runyan
(74) *Attorney, Agent, or Firm* — McDermott Will & Emery LLP

(57) ABSTRACT

Swellable spacer fluids can be useful in subterranean operations for sealing an annular space in a well bore, such as the annular space between a tubular and the subterranean formation or between two concentric tubulars, or for forming a seal inside a well bore in the subterranean formation. One embodiment of such methods involves providing a swellable fluid, wherein the swellable fluid comprises: an aqueous fluid, a crosslinking agent, and at least a plurality of swellable particles; and placing the swellable fluid in a subterranean formation, and allowing the spacer fluid to form a semi-solid crosslinked gel structure in the subterranean formation.

5 Claims, No Drawings

(56) References Cited

OTHER PUBLICATIONS

Abbasy, Laboratory Evaluation of Water Swellable Materials for Fracture Shutoff, SPE 111492, 2008, pp. 1-13, Society of Petroleum Engineers.
Bouras, Responsive Cementing Material Prevents Annular Leaks in Gas Wells, SPE 116757, 2008, pp. 1-10, Society of Petroleum Engineers.

* cited by examiner

SWELLABLE SPACER FLUIDS AND ASSOCIATED METHODS

BACKGROUND

The present invention relates to subterranean treatments and, more particularly, in certain embodiments, to swellable spacer fluids for sealing an annular space in a well bore, such as the annular space between a tubular and a subterranean formation, between two concentric tubulars, or for forming a seal in a subterranean formation.

Spacer fluids are commonly placed between one or more fluids contained in or to be pumped into a well bore. Among other things, a spacer fluid may be used to prevent intermixing between two incompatible fluids and could potentially provide increased compatibility should the incompatible fluids unintentionally intermix. For example, in primary cementing, a spacer fluid may be used to separate a cement composition and a drilling fluid, which may be incompatible. In addition, a spacer fluid may condition the surface of the pipe to promote a better cement bond. Moreover, a spacer fluid may be placed into the well bore between a cement composition and a drilling fluid to provide improved displacement of the drilling fluid from the well bore, thereby potentially improving bonding of the cement composition to the subterranean formation. Once a spacer fluid is in its final location within the well bore, a spacer fluid may act to provide continued separation of a cement composition from a drilling fluid. A spacer fluid may also be used to minimize or remove a filter cake from the formation.

The composition of a spacer fluid is generally tailored to the specific application. In some instances, a spacer fluid may comprise an aqueous fluid, a viscosifying agent, a weighting agent, and a surfactant. Among other things, the weighting agent may be included in the spacer fluid to provide increased density for well control and also increase the buoyancy effect of the spacer fluid on a viscosified drilling fluid and filter cake adhered to the walls of the well bore. Viscosifying agents may be included in spacer fluids to provide desirable rheological properties for suspending particle stability and fluid loss control. The surfactants may be included in the spacer fluids to enhance chemical compatibility of the spacer fluid with the other fluids in the well bore and to provide water-wet formation surfaces to improve cement bonding or to promote or minimize the entrainment of gases into the fluid.

SUMMARY

The present invention relates to subterranean treatments and, more particularly, in certain embodiments, to swellable spacer fluids for sealing an annular space in a well bore, such as the annular space between a tubular and a subterranean formation, between two concentric tubulars, or for forming a in a subterranean formation.

In an embodiment, the present invention provides a method comprising: providing a swellable fluid, wherein the swellable fluid comprises: an aqueous fluid, a crosslinking agent, and at least a plurality of swellable particles; and placing the swellable fluid in a subterranean formation, and allowing the swellable fluid to form a semi-solid crosslinked gel structure in the subterranean formation.

In another embodiment, the present invention provides a method comprising: after the placement of a first fluid in a well bore, placing a swellable spacer fluid into an annulus between a subterranean formation and a conduit disposed in a well bore, wherein the swellable spacer fluid comprises: an aqueous fluid, a crosslinking agent, and at least a plurality of swellable particles; and placing a second fluid into the annulus after the swellable spacer fluid such that the swellable spacer fluid is between the second fluid and the first fluid that is disposed in the annulus; and allowing the spacer fluid to form a semi-solid crosslinked gel structure in the annulus.

In yet another embodiment, the present invention provides a method comprising: providing a swellable fluid, wherein the swellable fluid comprises: an aqueous fluid, a silicate-based gelling agent system, and a swellable particle; and placing the swellable fluid in a subterranean formation.

The features and advantages of the present invention will be readily apparent to those skilled in the art. While numerous changes may be made by those skilled in the art, such changes are within the spirit of the invention.

DESCRIPTION OF THE PREFERRED EMBODIMENTS

The present invention relates to subterranean treatments and, more particularly, in certain embodiments, to swellable spacer fluids for sealing an annular space in a well bore, such as the annular space between a tubular and a subterranean formation, between two concentric tubulars, or for forming a seal in a subterranean formation. As used herein, the term "swellable spacer fluid" refers to a spacer fluid composition that comprises swellable particles.

There may be several potential advantages to the methods and compositions of the present invention, only some of which may be alluded to herein. One of the many potential advantages of the methods and compositions of the present invention may be that embodiments of the swellable spacer fluids may provide an annular seal in the well bore that is independent of the set cement sheath. The term "seal" or variations thereof, as used herein, does not imply any particular degree of sealing provided by the seal. By providing a redundant annular seal to the cement sheath, problems caused, for example, by damage to the cement sheath, may be minimized. Accordingly, embodiments of the swellable spacer fluids may prevent the loss of zonal isolation in spite of damage to the cement sheath. Another potential advantage may be use of the swellable spacer fluids, for example, to seal zones of a subterranean formation, such as lost circulation zones.

The swellable spacer fluids of the present invention comprise two types of embodiments: "polymer-based embodiments," and "nonpolymer-based embodiments." If not specifically referenced, then the discussion is applicable to both types of embodiments.

In the polymer-based embodiments, the swellable spacer fluids of the present invention generally may comprise an aqueous fluid, a gelling agent system comprising a polymer and a crosslinking agent capable of crosslinking the polymer to form a crosslinked gel structure in the formation, and at least one swellable particle. As used herein, the term "polymer" is defined to include homopolymers, copolymers, terpolymers, oligomers, and any combination thereof. In an example of such an embodiment, the polymer may be a copolymer of an ethylenically unsaturated polar monomer and an ethylenically unsaturated ester.

In the nonpolymer-based embodiments, the swellable spacer fluids of the present invention may comprise an aqueous fluid, a gelling agent system comprising a silicate-based gelling agent, and at least one swellable particle.

In some embodiments, the swellable spacer fluids of the present invention may form a semi-solid crosslinked gel structure in a subterranean formation that is capable of acting as an annular seal. The phrase "in a subterranean formation" is used to describe, in general terms, the location of the formation of the semi-solid crosslinked gel structure downhole. The semi-solid crosslinked gel structure may form in a portion of a well bore, in the surrounding subterranean formation, or some combination thereof. Even after formation of the semi-solid crosslinked gel structure, the swellable particles present in the fluid, may swell due to absorption of water from the semi-solid crosslinked gel structure, water or liquid hydrocarbons from well bore fluids, and/or reservoir fluids. The term "semi-solid crosslinked gel structure" as used herein refers to a gel structure that is substantially not flowable once formed downhole. In some embodiments, the semi-solid crosslinked gel structure may be observed to swell for up to 25 days. The semi-solid crosslinked gel structure also may be characterized as an elastic semi-solid hydrogel, which may provide a seal (e.g., an annular seal) in a subterranean formation.

Some embodiments of the swellable spacer fluids of the present invention may have a density in the range of about 8.5 pounds per gallon (lb/gal) to about 24 lb/gal. In certain embodiments, the spacer fluids of the present may have a pH in the range of about 5 to about 11.

Examples of suitable aqueous fluids which can be used in either the polymer-based embodiments or the nonpolymer-based embodiments of the swellable spacer fluids of the present invention include, but are not limited to, water based foams, fresh water, salt water, formation water, various aqueous solutions, brines, and any combination thereof. The aqueous fluid generally may be from any source, provided that it does not comprise components that might undesirably effect other components of the swellable spacer fluids. For example, suitable aqueous fluids may include freshwater, saltwater (e.g., water containing one or more salts dissolved therein), brines (e.g., natural or produced brines), seawater, or another aqueous fluid that does not undesirably effect the other components in the permeability modifying fluid. In certain polymer embodiments, an aqueous fluid included may be a brine in an amount of about 90% to 99.5% by weight of the polymer. In certain nonpolymer embodiments, an aqueous fluid included may be a brine in an amount of about 85% to 95% by weight of the polymer.

The swellable spacer fluids of the present invention may comprise swellable particles. As used herein, a particle is characterized as swellable when it swells upon contact with an aqueous fluid (e.g., water, brine, etc.), an non-aqueous fluid (e.g., oil, glycol, etc.), or a gas. Some particles may swell in the presence of each of these types of fluids to some degree; however, if described herein as swellable in the presence of an aqueous fluid, the particle swells more predominantly in the presence of an aqueous fluid and the same for those discussed as swelling in the presence of an non-aqueous fluid. Suitable swellable particles are described in the following references, each of which is incorporated by reference herein in its entirety: U.S. Pat. No. 3,385,367, U.S. Pat. No. 7,059,415, U.S. Pat. No. 7,578,347, U.S. Pat. App. No. 2004/0020662, U.S. Pat. App. No. 2007/0246225, U.S. Pat. App. No. 2009/0032260 and WO2005/116394.

Swellable particles suitable for use in embodiments of the present invention may generally swell by up to about 200% of their original size at the surface. Under downhole conditions, this swelling may be more, or less, depending on the conditions present. For example, the swelling may be at least 10% under downhole conditions. In some embodiments, the swelling may be up to about 50% under downhole conditions. Although the rate of swelling may be hours in some embodiments, in certain embodiments the rate of swelling may be measured in minutes. The rate of swelling is defined as the amount of time required for the swelled composition to reach an equilibrium state, where swelling has ceased. However, as those of ordinary skill in the art, with the benefit of this disclosure, will appreciate, the actual swelling when the swellable particles are included in a swellable spacer fluid may depend on, for example, the concentration of the swellable particles included in the swellable spacer fluid. In accordance with embodiments of the present invention, the swellable particles may increase the viscosity of the semi-solid crosslinked gel structure. In certain embodiments, the increase in viscosity of the semi-solid crosslinked gel structure may be about 10-fold or greater.

An example of a swellable particle that may be utilized in embodiments of the present invention comprises a swellable elastomer that swells in the presence of a non-aqueous fluid or an aqueous-based fluid. Some specific examples of suitable swellable elastomers that swell in the presence of a non-aqueous fluid include, but are not limited to, natural rubbers, acrylate butadiene rubbers, isoprene rubbers, chloroprene rubbers, butyl rubbers, brominated butyl rubbers, chlorinated butyl rubbers, chlorinated polyethylenes, neoprene rubbers, styrene butadiene copolymer rubbers, chlorinated polyethylene, sulphonated polyethylenes, ethylene acrylate rubbers, epichlorohydrin ethylene oxide copolymers, epichlorohydrin terpolymer, ethylene-propylene rubbers, ethylene vinyl acetate copolymers, ethylene-propylene-diene terpolymer rubbers, ethylene vinyl acetate copolymer, nitrile rubbers, acrylonitrile butadiene rubbers, hydrogenated acrylonitrile butadiene rubbers, carboxylated high-acrylonitrile butadiene copolymers, polyvinylchloride-nitrile butadiene blends, fluorosilicone rubbers, silicone rubbers, poly 2,2,1-bicyclo heptenes (polynorbornene), alkyl-styrenes, polyacrylate rubbers such as ethylene-acrylate copolymer, ethylene-acrylate terpolymers, fluorocarbon polymers, copolymers of poly(vinylidene fluoride) and hexafluoropropylene, terpolymers of poly(vinylidene fluoride), hexafluoropropylene, and tetrafluoroethylene, terpolymers of poly(vinylidene fluoride), polyvinyl methyl ether and tetrafluoroethylene, perfluoroelastomers such as tetrafluoroethylene perfluoroelastomers, highly fluorinated elastomers, butadiene rubber, polychloroprene rubber, polyisoprene rubber, polynorbornenes, polysulfide rubbers, polyurethanes, silicone rubbers, vinyl silicone rubbers, fluoromethyl silicone rubber, fluorovinyl silicone rubbers, phenylmethyl silicone rubbers, styrene-butadiene rubbers, copolymers of isobutylene and isoprene known as butyl rubbers, brominated copolymers of isobutylene and isoprene, chlorinated copolymers of isobutylene and isoprene, and any combination thereof. An example of a commercially available product comprising such swellable particles may include a commercially available product from Halliburton Energy Services, in Norway, under the trade name "EASYWELL."

Suitable examples of useable fluoroelastomers that swell in the presence of a non-aqueous fluid are copolymers of vinylidene fluoride and hexafluoropropylene and terpolymers of vinylidene fluoride, hexafluoropropylene and tetrafluoroethylene. The fluoroelastomers suitable for use in the disclosed invention are elastomers that may comprise one or more vinylidene fluoride units ("VF$_2$" or "VdF"), one or more hexafluoropropylene units ("HFP"), one or more tetrafluoroethylene units ("TFE"), one or more chlorotrifluoroethylene ("CTFE") units, and/or one or more perfluoro (alkyl vinyl ether) units ("PAVE"), such as perfluoro(methyl vinyl ether) ("PMVE"), perfluoro(ethyl vinyl ether)

("PEVE"), and perfluoropropyl vinyl ether ("PPVE"). These elastomers can be homopolymers or copolymers. Particularly suitable are fluoroelastomers containing vinylidene fluoride units, hexafluoropropylene units, and, optionally, tetrafluoroethylene units and fluoroelastomers containing vinylidene fluoride units, perfluoroalkyl perfluorovinyl ether units, and tetrafluoroethylene units, such as the vinylidene fluoride type fluoroelastomer known under the trade designation "AFLAS®" available from Asahi Glass Co., Ltd. Especially suitable are copolymers of vinylidene fluoride and hexafluoropropylene units. If the fluoropolymers contain vinylidene fluoride units, the polymers may contain up to 40 mole % $VF_2$ units, e.g., 30-40 mole %. If the fluoropolymers contain hexafluoropropylene units, the polymers may contain up to 70 mole % HFP units. If the fluoropolymers contain tetrafluoroethylene units, the polymers may contain up to 10 mole % TFE units. When the fluoropolymers contain chlorotrifluoroethylene the polymers may contain up to 10 mole % CTFE units. When the fluoropolymers contain perfluoro(methyl vinyl ether) units, the polymers may contain up to 5 mole % PMVE units. When the fluoropolymers contain perfluoro(ethyl vinyl ether) units, the polymers may contain up to 5 mole % PEVE units. When the fluoropolymers contain perfluoro(propyl vinyl ether) units, the polymers may contain up to 5 mole % PPVE units. The fluoropolymers may contain 66%-70% fluorine. One suitable commercially available fluoroelastomer is that known under the trade designation "TECHNOFLON FOR HS®" sold by Ausimont USA. This material contains "Bisphenol AF" manufactured by Halocarbon Products Corp. Another commercially available fluoroelastomer is known under the trade designation "VITON®AL 200," by DuPont Dow Elastomers, which is a terpolymer of $VF_2$, HFP, and TFE monomers containing 67% fluorine. Another suitable commercially available fluoroelastomer is "VITON®AL 300," by DuPont Dow Elastomers. A blend of the terpolymers known under the trade designations "VITON®AL 300" and "VITON®AL 600" can also be used (e.g., one-third AL-600 and two-thirds AL-300); both are available from DuPont Dow Elastomers. Other useful elastomers include products known under the trade designations "7182B" and "7182D" from Seals Eastern, Red Bank, N.J.; the product known under the trade designation "FL80-4" available from Oil States Industries, Inc., Arlington, Tex.; and the product known under the trade designation "DMS005" available from Duromould, Ltd., Londonderry, Northern Ireland. One process for making a swellable elastomer useful in the present invention may involve grafting an unsaturated organic acid molecule. A common example of an unsaturated organic acid used for this purpose is maleic acid. Other molecules that can be used include mono- and di-sodium salts of maleic acid and potassium salts of maleic acid. Although in principle other unsaturated carboxylic acids may also be grafted onto commercial unsaturated elastomers, acids that exist in solid form may not require additional steps or manipulation, as will be readily apparent to those having reasonable skill in the chemical art. Mixing other unsaturated acids such as acrylic acid and methacrylic acid is also possible but may be more difficult since they are liquids at room temperature. Unsaturated acids such as palmitoleic acid, oleic acid, linoleic acid, and linolenic acid may also be used. The initial reaction leads to a relatively non-porous "acid-grafted rubber." In order to enhance the swelling of elastomers, addition of a small amount of alkali such as soda ash, along with or separate from the unsaturated acid, leads to formation of a porous, swellable acid grafted rubber. Micro-porosities are formed in the composition, allowing the water to rapidly reach the interior region of a molded part and increase the rate and extent of swelling. An organic peroxide vulcanizing agent may be employed to produce a vulcanized, porous, swellable acid-grafted rubber formulation. In one embodiment, 100 phr of EPDM, 5-100 phr of maleic acid, 5-50 phr of sodium carbonate, and 1-10 phr of dicumyl peroxide as vulcanizing agent showed at least 150 percent swelling of elastomer when exposed to both water at 100° C. for 24 hrs and at room temperature for 24 hrs in kerosene. Other commercially available grades of organic peroxides, as well as other vulcanization agents, may be employed. The resulting elastomeric compositions may be described as non-porous, or porous and swelled, acid-grafted rubbers, which may or may not be vulcanized. The terms "vulcanized" and "crosslinked" are used interchangeably herein, although vulcanization technically refers to a physicochemical change resulting from crosslinking of the unsaturated hydrocarbon chain of polyisoprene with sulfur, usually with the application of heat. The relatively hydrophobic linear or branched chain polymers and relatively hydrophilic water-soluble monomers, either grafted onto the polymer backbone or blended therein, may act together to cost-effectively increase the water- and/or oil-swellability of oilfield elements that comprise one or more apparatus of the invention. In particular, the use of unsaturated organic acids, anhydrides, and their salts (for example maleic acid, maleic anhydride, and theirs salts), offer a commercially feasible way to develop inexpensive composites materials with good water- and brine-swellability, and optionally hydrocarbon fluid swellability, depending on the type of inorganic additives and monomers used.

Elastomers such as nitrile, HNBR, fluoroelastomers, or acrylate-based elastomers, or their precursors, if added in variable amounts to an EPDM polymer or its precursor monomer mixture, along with a sufficient amount (from about 1 to 10 phr) of an unsaturated organic acid, anhydride, or salt thereof, such as maleic acid, optionally combined with a sufficient amount (from 1 about to 10 phr) an inorganic swelling agent such as sodium carbonate, may produce a water-swellable elastomer having variable low-oil swellability. Addition to the monomer mixture, or to the elastomer after polymerization, of a sufficient amount (from about 0.5 to 5 phr) of a highly acidic unsaturated compound such as 2-acrylamido-2-methylpropane sulfonic acid (AMPS), results in a water-swellable elastomer having variable oil-swellability, and which is further swellable in low pH fluids such as completion fluids containing zinc bromide. A second addition of a sufficient amount (from 1 to 10 phr more than the original addition) of inorganic swelling agent enhances swellability in low pH, high concentration brines. Finally, the addition of a sufficient amount (from 1 to 20 phr) of zwitterionic polymer or copolymer of a zwitterionic monomer with an unsaturated monomer, results in a cross-linked elastomer. The amounts of the various ingredients at each stage may be varied as suited for the particular purpose at hand. For example, if one simply wishes to produce a highly cross-linked, moderately water-swellable (about 100 percent swell) elastomer having very low oil-swellability but very high swellability in low pH fluids, one would use a recipe of 60 to 80 phr of EPDM, and 20 to 40 phr of nitrile or HNBR, and 4 to 5 phr of AMPS, as well as about 15 to 20 phr of a zwitterionic polymer or monomer.

Another reaction scheme useful in the present invention, enabling a low-cost procedure for making swellable elastomers, involves the use of AMPS monomer and like sulfonic acid monomers. Since AMPS monomer is chemically stable up to at least 350° F. (177° C.), mixtures of EPDM and AMPS monomer which may or may not be grafted on to EPDM will function as a high-temperature resistant water-swellable elastomer. The use of AMPS and like monomers maybe used in like fashion to functionalize any commercial elastomer to make a high-temperature water-swellable elastomer. An advantage of using AMPS is that it is routinely used in oilfield industry in loss circulation fluids and is very resistant to down hole chemicals and environments.

Other swellable elastomers that behave in a similar fashion with respect to aqueous fluids also may be suitable. Some specific examples of suitable swellable elastomers that swell in the presence of an aqueous-based fluid, include, but are not limited to, starch-polyacrylate acid graft copolymer, polyvinyl alcohol cyclic acid anhydride graft copolymer, isobutylene maleic anhydride, acrylic acid type polymers, vinylacetate-acrylate copolymer, polyethylene oxide polymers, carboxymethyl cellulose type polymers, starch-polyacrylonitrile graft copolymers and the like, and highly swelling clay minerals such as sodium bentonite having montmorillonite as main ingredient, and any combination thereof.

Preferably said compound is present in the form of particulate matter embedded in the matrix material. One example of such particulate matter is salt, preferably dissociating salt, which can be uniformly compounded into the base rubber. A suitable salt is one of the group of acetates, bicarbonates, carbonates, formates, halides (MxHy) (H=Cl, Br or I), hydrosulphides, hydroxides, imides, nitrates, nitrides, nitrites, phosphates, sulphides, sulphates, and any combination thereof. Also, other salts are can be applied wherein the cation is a non-metal like $NH_4Cl$. However the preferred salts are NaCl and $CaCl_2$. Of these, $CaCl_2$ is most preferred in view of its divalent characteristic and because of its reduced tendency to leach out from the base rubber due to reduced mobility of the relatively large Ca atom in the base rubber.

To limit leaching out of the salt from the swellable elastomer, suitably the swellable particles include a hydrophilic polymer containing polar groups of either oxygen or nitrogen in the backbone or side groups of the polymer matrix material. These side groups can be partially or fully neutralized. Hydrophilic polymers of such type are, for example, alcohols, acrylates, methacrylates, acetates, aldehydes, ketones, sulfonates, anhydrides, maleic anhydrides, nitriles, acrylonitriles, amines, amides, oxides (polyethylene oxide), cellulose types including all derivatives of these types, all copolymers including one of the above all grafted variants. In one instance, a ternary system may be applied which includes an elastomer, a polar SAP and a salt, whereby the polar SAP is grafted onto the backbone of the elastomer. Such system has the advantage that the polar SAP particles tend to retain the salt particles in the elastomer matrix thereby reducing leaching of the salt from the elastomer. The polar salt is attracted by electrostatic forces to the polar SAP molecules which are grafted onto the backbone of the rubber.

In certain embodiments, some of the elastomers that swell in non-aqueous fluids may also swell in aqueous-based fluids. Suitable elastomers that may swell in both aqueous-based and non-aqueous fluids, include, but are not limited to ethylene propylene rubbers, ethylene-propylene-diene terpolymer rubbers, butyl rubbers, brominated butyl rubbers, chlorinated butyl rubbers, chlorinated polyethylene, neoprene rubbers, styrene butadiene copolymer rubbers, sulphonated polyethylenes, ethylene acrylate rubbers, epichlorohydrin ethylene oxide copolymer, silicone rubbers and fluorosilicone rubbers, and any combination thereof. Those of ordinary skill in the art, with the benefit of this disclosure, will know the appropriate fluid to use in order to swell a particular swellable elastomer.

In certain embodiments, the swellable elastomers may be crosslinked and/or lightly crosslinked. Other swellable elastomers that behave in a similar fashion with respect to fluids also may be suitable. Those of ordinary skill in the art, with the benefit of this disclosure, will be able to select appropriate swellable elastomers for use in embodiments of the swellable spacer fluids of the present invention based on a variety of factors, including the application in which the composition will be used and the desired swelling characteristics.

Where used, the swellable particles generally may be included in the embodiments of the swellable spacer fluids in an amount sufficient to provide the desired mechanical properties. In some embodiments, the swellable particles may be present in an amount up to about 50% by volume of the swellable spacer fluid. In some embodiments, the swellable particles may be present in a range of about 5% to about 95% by volume of the swellable spacer fluid. Any combinations of suitable swellable elastomers may also be used.

In addition, the swellable particles that are utilized may have a wide variety of shapes and sizes of individual particles suitable for use in accordance with embodiments of the present invention. By way of example, the swellable particles may have a well-defined physical shape as well as an irregular geometry, including the physical shape of platelets, shavings, fibers, flakes, ribbons, rods, strips, spheroids, beads, pellets, tablets, or any other physical shape. In some embodiments, the swellable particles may have a particle size in the range of about 5 microns to about 1,500 microns. In some embodiments, the swellable particles may have a particle size in the range of about 20 microns to about 500 microns. However, particle sizes outside these defined ranges also may be suitable for particular applications.

Examples of suitable gelling agent systems for use in the nonpolymer-based embodiments of the spacer fluids of the present invention include, but are not limited to, silicate-based gelling agent systems. In some instances, the gelled silicate solution may be formed from a reaction comprising a silicate and urea in an aqueous fluid. In other instances, the gelled silicate system may be formed from a reaction comprising a silicate and lactose. In particular embodiments, the silicate-based gelling agent may be present in the spacer fluid in an amount from about 1% to about 10% by weight of the spacer fluid, and preferably at about 6% of the spacer fluid. The silicate-based gelling agent systems present in the nonpolymer-based embodiments of the spacer fluids may comprise colloidal silica particles of any grade, particle size, or surface area, and the particles may have any particle size distribution. In some embodiments, the average particle size of the colloidal silica particles used in the methods of the present invention is about 40 nm or less. In some embodiments, the colloidal silica particles used in the present invention may have a particle size of about 15 nm or less, or more preferably, of about 10 nm or less. In one exemplary embodiment, the colloidal silica has a particle size in the range of about 2 nm to about 10 nm. In general, the colloidal silica component of the present invention may comprise any colloidal silica particles that are capable of increasing the viscosity of a treatment fluid without adversely reacting with other substances that are present in the treatment fluid or subterranean formation.

In certain embodiments, an activator may be introduced for the purpose of creating a colloidal silica gel as part of the silicate-based gelling agent system. The activator that is used in certain embodiments of the present invention may comprise any substance that is capable of reacting with a colloidal silica component to increase the viscosity of a treatment fluid. In some embodiments, the activator may comprise an organic or inorganic salt, nitrate, sulphate, sulphide, hydroxide, or acid. In preferred embodiments, the activator may comprise salts such as sodium chloride, potassium chloride, sodium nitrate, potassium nitrate, and the like, and any combination thereof. In some embodiments the activator may be provided as a powdered material, while in other embodiments, the activator may be provided as a liquid material, e.g., as a solution or a suspension of a powdered material in liquid. It is also within the scope of the present invention that the activator may be naturally present in the subterranean formation, e.g. the activator may be present in formation fluids that are native to the formation. In some embodiments, the type and amount of activator used may depend on several factors including the colloidal silica component used, the temperature of the subterranean formation, the desired time in which the viscosity of the treatment fluid should begin to increase and/or reach its final viscosity, etc. In some embodiments, the activator may be present in the treatment fluid in an amount in the range of about 0.001% m/v to about 10% m/v of the colloidal silica component.

Suitable polymers for use in the polymer-based embodiments of the spacer fluids of the present invention include, but are not limited to, a water-soluble copolymer of at least one nonacidic ethylenically unsaturated polar monomer and at least one copolymerizable ethylenically unsaturated ester, polyalkyleneimines, polyalkylenepolyamines, polyacrylamides, AMPS® (2-acrylamido-2-methylpropane sulfonic acid)/acrylamide copolymers, sulfonated styrene/maleic anhydride copolymers, vinylpyrrolidone/AMPS®/acrylamide terpolymers, AMPS®/N—N-dimethyl-acrylamide/acrylamide terpolymers, and any combination thereof. In particular embodiments of the polymer-based embodiments of the spacer fluids of the present invention, the polymers may be present in the spacer fluid in an amount from about 0.5% to about 10% by weight of the spacer fluid, and preferably at about 5% of the spacer fluid The copolymer included in the polymer-based embodiments of the spacer fluids of the present invention may be formed from monomers comprising an ethylenically unsaturated polar monomer and an ethylenically unsaturated ester. The copolymer may contain from about 0.01 to about 50 mole % of the polar monomer and from about 50 to about 99.99 mole % mole % of the ester. In certain embodiments, the polar monomer may be present in the copolymer in an amount of about 85 to about 95 mole % with the ester being present in an amount of from about 5 to about 15 mole %. The copolymer may be a block or non-block copolymer, a regular or random copolymer, or a graft copolymer, for example, with the ester grafted onto a polymerized polar monomer. By way of example, the ester may be grafted onto polyacrylamide.

The copolymer may be soluble in water to the extent of at least 10 grams per liter in distilled water at 15° C. and 10 grams per liter in an aqueous sodium chloride solution containing 32 grams per liter of sodium chloride at 25° C. In some embodiments, as desired, the copolymer can be mixed with a surfactant to facilitate its solubility in the aqueous fluid utilized. The copolymer may have an average molecular weight in the range of about 50,000 to 20,000,000 and, alternatively, of about 100,000 to about 500,000, as determined using gel permeation chromatography. A copolymer having an average molecular weight of about 50,000 may have a viscosity when dissolved in distilled water in the amount of about 3.6% by weight of the solution at 19° C. of from about 10 to about 500 centipoises. In certain embodiments, the copolymer may be shear thinable whereby the viscosity reduces by at least 10% on increasing shear rate by 10%. The copolymer may be produced by conventional methods for copolymerizing ethylenically unsaturated monomers in solution, emulsion or suspension.

Examples of suitable ethylenically unsaturated polar monomers may be derived from an unsaturated carboxylic acid wherein the unsaturated group may be vinyl or alpha methyl vinyl. The polar monomer formed from the unsaturated carboxylic acid is non-acidic and may be a primary, secondary, or tertiary amide of the unsaturated carboxylic acid. In certain embodiments, the amide may be derived from ammonia or a primary or secondary alkylamine, for example, an alkyl amine having from 1 to 10 carbon atoms which may also be substituted by at least one hydroxyl group. By way of example, the amide of the unsaturated carboxylic acid may be an alkylol amide such as ethanolamide. Examples of suitable ethylenically unsaturated polar monomers include, but are not limited to, acrylamide, methacrylamide, and acrylic ethanol amide. The ethylenically unsaturated polar monomer may also be a vinyl heterocyclic compound with at least an oxygen, sulfur, or nitrogen atom in a ring with 3 to 8 carbon atoms, such as one with at least one carbonyl group in the ring, e.g., N-vinylpyrrolidone, caprolactam or a vinyl pyridine.

Examples of suitable ethylenically unsaturated esters which can be used with the ethylenically unsaturated polar monomer described above to form a copolymer may be formed from a hydroxyl compound and an ethylenically unsaturated carboxylic acid. The ethylenically unsaturated group may be in the alpha to beta or the beta to gamma position relative to the carboxyl group. In certain embodiments, the ethylenically unsaturated carboxylic acid may have in the range of from about 3 to about 20 carbon atoms. Examples of suitable ethylenically unsaturated carboxylic acid include, but are not limited to, acrylic acid, methacrylic acid, crotonic acid, and cinnamic acids. An example of a suitable ethylenically unsaturated ester includes t-butyl ester.

The hydroxyl compound that may be used to form the ethylenically unsaturated esters may be an alcohol of the formula ROH, where R comprises a hydrocarbyl group. Examples of suitable hydrocarbyl groups include alkyl groups having from 1 to 30 carbon atoms, alkenyl groups having from about 2 to about 20 carbon atoms, cycloalkyl groups having from 5 to 8 carbon atoms, aryl groups such as aromatic hydrocarbyl groups having from 6 to 20 carbon atoms, and arylalkyl groups having from about 7 to about 24 carbon atoms. Specific examples of hydrocarbyl groups include methyl, ethyl, propyl, butyl, amyl, hexyl, octyl, 2-ethylhexyl and decyl (including all stereoisomers), allyl, cyclohexyl, palmityl, stearyl, phenyl and benzyl. In certain embodiments, the hydrocarbyl group may be substituted by at least one, e.g., from 1 to 3 substituents, such as hydroxyl, ether, and thioether groups. The substituent group may be an electron donating group. In certain embodiments, ether substituents may also be used, for example, alkoxy, aryloxy, and arylalkoxy in which the alkyl, aryl and arylalkyl groups may be as described above. The substituent, in certain embodiments, may be on the same carbon atom of the R group as is bonded to the hydroxyl group in the hydroxyl compound with alkoxymethyl and arylalkyloxy methyl groups being used in certain instances. The hydroxyl group may be a primary, secondary, iso or tertiary compound, for example, with a tertiary carbon atom bonded to the hydroxyl group, such as tert-butyl and trityl. The hydroxyl group may also comprise a heterocyclic group either for bonding directly to the hydroxyl group of ROH or separated therefrom by an alkylene group having 1 to 4 carbon atoms such as methylene. For example, the hydroxyl group may be a saturated or unsaturated heterocyclic or heterocyclic alkylene group, e.g., having about 3 to about 8 carbon atoms and at least one or two ring heteroatoms selected from oxygen, nitrogen and sulfur. Examples of such groups are furyl, tetrahydrofuryl, furfuryl and tetrahydrofurfuryl, pyranyl, and tetrahydropyranyl. Examples of suitable hydrocarbyl groups include tert-butyl, trityl, methoxymethyl, benzyloxymethyl and tetrahydropyranyl. Other examples of hydrocarbyl groups include stearyl, isopropyl, ethyl and methyl.

As noted above, the copolymer may comprise an ethylenically unsaturated polar monomer and an ethylenically unsaturated ester. In certain embodiments, the copolymer may be a copolymer of the ethylenically unsaturated polar monomer and an ethylenically unsaturated ester. Alternatively, additional monomers may be included in the copolymer, forming, for example, terpolymers and tetrapolymers. Examples of additional monomers, include, but are not limited to, 2-acrylamido-2-methylpropane sulphonic acid and N-vinylpyrrolidone. It is believed that the additional polymer may slow down the crosslinking of embodiments of the swellable spacer fluids and increase its gel strength after it is cross-linked. In certain embodiments, the copolymer may be a terpolymer that comprises about 50 to about 98.9 mole % of the polar monomer, about 0.01 to about 50 mole % of the ester, and about 1 to about 40 mole % of the 2-acrylamido-2-methylpropane sulphonic acid or the N-vinylpyrrolidone. In certain embodiments, the copolymer may be a tetrapolymer that comprises about 50 to about 97.9 mole % of the polar monomer, about 0.01 to about 50 mole % of the ester, about 1 to about 20 mole % of 2-acrylamido-2-methylpropane sulphonic acid, and about 1 to about 20 mole % of N-vinylpyrrolidone. The terpolymer or tetrapolymer may be a block or non-block polymer, a regular or random polymer or a graft polymer.

The copolymer of the ethylenically unsaturated polar monomer and the ethylenically unsaturated ester may be present in embodiments of the swellable spacer fluids in an amount sufficient to, for example, provide the desired crosslinked gel. In certain embodiments, the copolymer may be present in an amount of about 500 to about 10,000 ppm for copolymers of molecular weight of at least 1 million, and 10,000 to 100,000 ppm for copolymer of molecular weight 50,000 to 1 million.

For crosslinking the copolymer of the ethylenically unsaturated polar monomer and the ethylenically unsaturated ester an organic gelling agent may be used. In general, the organic gelling agent may comprise a metal-ion chelated water-soluble polymer capable of crosslinking the copolymers. For example, the organic gelling agent may be capable of crosslinking an acrylic acid polymer in aqueous solution to form a gel at 20° C. to 200° C. and, alternatively, 40° C. to 150° C. Examples of suitable metal-ion chelated water-soluble polymers include, but are not limited to, chelated polyalkylene imines, such as polyethylene imines and polypropylene imines. By chelating the polymer with a metal ion, premature crosslinking at high temperatures may be prevented. For example, the polymer (e.g., polyalkylene imine) may be chelated with a zirconium ion, cobalt ion, nickel ion, ferric ion, titanium IV ion, or copper ion. In general, the organic gelling agent may comprise a ratio of metal ion to chelated water-soluble polymer of about 2:1 to about 1:10 parts by weight, and, alternatively about 1:5 parts by weight. Compositions that form crosslinked gels from crosslinking a copolymer of the ethylenically unsaturated polar monomer and the ethylenically unsaturated ester with an organic gelling agent are described in more detail in U.S. Pat. Nos. 5,836,392, 6,192,986, and 6,196,317, the disclosure of which are incorporated herein by reference.

The organic gelling agent may be present in embodiments of the swellable spacer fluids of the present invention in an amount sufficient to, for example, provide a desired crosslinked gel. In certain embodiments, the organic gelling agent may be present in an amount of about 10 to about 50,000 ppm. By way of example, the organic gelling agent may be present in a range of about 1,000 to about 10,000 ppm for copolymers of molecular weight of at least 1 million. By way of further example, the organic gelling agent may be present in a range of about 1,000 to 100,000 ppm for copolymers of having a molecular weight of about 50,000 to 1 million.

Suitable crosslinking agents for use in these embodiments include any suitable crosslinking agent that can interact with the polymer so as to form a crosslinked gel structure. The term "crosslinking agent" as used herein is defined to include any substance that is capable of promoting or regulating intermolecular bonding between polymer chains, linking them together to create a more rigid structure. Examples of suitable crosslinking agents for these embodiments include, but are not limited to, polyethyleneimine, chromium, tungsten, molybdenum, unnilhexium, phenol, formaldehyde, hydroquinone, chitosan (e.g., for polyacrylamide polymers and "H2ZERO" copolymers (commercially available from Halliburton Energy Services in Duncan, Okla.), zirconium, titanium, aluminum, and any combination thereof.

In another embodiment of the polymer-based embodiments of the spacer fluids of the present invention, the gelling agent system may comprise a water soluble polymerizable monomer and a polymerization initiator. A variety of water-soluble polymerizable monomers can be used with the present invention. Examples of such monomers include acrylic acid, methacrylic acid, acrylamide, methacrylamide, 2-methacrylamido-2-methyl propane sulfonic acid, 2-acrylamido-2-methyl propane sulfonic acid (AMPS®), N,N-dimethylacrylamide, vinyl sulfonic acid, N,N-dimethylaminoethylmethacrylate, 2-triethylammoniumethyl methacrylate chloride, N,N-dimethylaminopropylmethacrylamide, methacrylamide, methacrylamidopropyl trimethylammonium chloride, N-vinyl pyrrolidone, vinylphosphonic acid, methacryloyloxyethyl trimethylammonium sulfate, and any combination thereof. A variety of multifunctional monomers of the present invention, including, but not limited to, tetraethylene glycol diacrylate, glycerol dimethacrylate, glycerol diacrylate, ethoxylated glycerol dimethacrylate, ethoxylated glycerol diacrylate, propoxylated glycerol dimethacrylate, propoxylated glycerol diacrylate, ethoxylated glycerol trimethacrylate, ethoxylated glycerol triacrylate, propoxylated glycerol trimethacrylate, propoxylated glycerol triacrylate, ethoxylated trimethylol propane trimethacrylate, propoxylated trimethylolpropane trimethacrylate, ethoxylated trimethylolpropane triacrylate, propoxylated trimethylolpropane triacrylate, ethoxylated or propoxylated pentaerythritol di-, tri-, or tetra-methacrylate or acrylate, methylene-bis-acrylamide and methylene-bis-methacrylamide.

The polymerization initiator can be any suitable water soluble compound that forms free radicals in aqueous solutions. Such compounds include, but are not limited to, azo compounds, such as 4,4'-azobis(4-cyanopentanoic acid), 2,2'-azobis(N,N'-dimethylene isobutyramidine) dihydrochloride, 2,2'-azobis(2-amidinopropane)dihydrochloride, and 2,2'-azobis(2-methyl-N-(2-hydroxyethyl) propionamide), alkali metal persulfates, such as sodium persulfate, potassium persulfate and ammonium persulfate, peroxides, such as hydrogen peroxide and tertiary-butyl hydroperoxide, oxidation-reduction systems employing reducing agents, such as, bisulfite, sulfite, thiosulfate and metabisulfite in combination with oxidizers such as silver (I), copper(I), iron (III), chlorite and hydrogen peroxide.

In some instances, additional components may be included to either the polymer-based embodiments or the nonpolymer-based embodiments of the present invention, such as weighting agents, scouring agents, surfactants, pH-adjusting additives, filtration control additives, dispersants, biocides, friction reducers, and any combination thereof. Optionally, other components may be included in the spacer fluids if desired, as recognized by one skilled in the art with the benefit of this disclosure.

As described above, embodiments of the swellable spacer fluids of the present invention may comprise a surfactant for promoting compatibility between components or well bore fluids, improving emulsification properties or de-emulsification properties, and enhancing foam creation qualities or foam breaking qualities, and/or water wetting characteristics. Suitable surfactants that may be used may include nonionic, anionic, cationic, amphoteric, and zwitterionic surfactants. Examples of suitable surfactants include, but are not limited to, alkyl phosphonate surfactants (e.g., a $C_{12}$-$C_{22}$ alkyl phosphonate surfactant), ethoxylated nonyl phenol phosphonate esters, alkyl aryl sulfonates including alkyl benzyl sulfonates such as salts of dodecylbenzene sulfonic acid, alkyl trimethylammonium chloride, branched alkyl ethoxylated alcohols, phenol-formaldehyde nonionic resin blends, cocobetaines, dioctyl sodium sulfosuccinate, imidazolines, alpha olefin sulfonates, linear alkyl ethoxylated alcohols, trialkyl benzylammonium chloride, polyaminated fatty acids, and the like. Substantially any other surfactant that is known to be suitable for use in the treatment of subterranean formations and which does not adversely react with the fluid may be utilized.

In certain embodiments, the surfactant may be included in an amount of about 0.1% to about 10% by weight of the swellable spacer fluid and, alternatively, of about 2 to about 5 by weight of the swellable spacer fluid.

In accordance with embodiments of the present invention, an embodiment of an elastic swellable semi-solid gelatinous material may be placed into a well bore between a first fluid and a second fluid. The swellable spacer fluid, for example, may be placed into an annulus between a tubular and the subterranean formation ahead of the second fluid. Among other things, the spacer fluid may be used to separate the first fluid and the second fluid in the well bore. In addition, the spacer fluid may at least partially remove the first fluid from the walls of the well bore and also displace the first fluid from the well bore. In certain embodiments, the swellable spacer fluid may be placed into a well bore between a drilling fluid and a cement composition. In general, the drilling fluid may be any drilling fluid that may be used in drilling the well bore. For example, the drilling fluid may be a water-based drilling fluid, an oil-based drilling fluid, or a non-aqueous-based drilling fluid, either of which may be foamed or emulsified. In general, the cement composition may comprise, for example, cement and water.

As described above, swellable fluids should set with time and temperature to form an elastic swellable semi-solid gelatinous material in the well bore, for example. Accordingly, once placed into the well bore, it is believed that the swellable spacer fluids may provide an annular seal in the well bore by forming a semi-solid crosslinked gel structure. This annular seal may, for example, be independent of the set cement sheath. By providing a redundant annular seal to the cement sheath, problems caused, for example, by damage to the cement sheath may be minimized. Accordingly, embodiments of the swellable spacer fluids may prevent the loss of zonal isolation in spite of damage to the cement sheath. In addition to providing a seal in the annulus between the casing and the formation or between two concentric tubulars or in the well bore itself, it is believed that at least some of the swellable spacer fluid will leak off into the near well bore region of the formation (e.g., the area of the formation about 1 to 3 well bores in diameter). Accordingly, it is believed that this penetration into the formation should provide additional seal, for example, in the near well bore region.

Embodiments of the present invention may include placement of one or more additional spacer fluids between the first fluid and the second fluid. For example, a spacer fluid may be placed into the well bore between the drilling fluid and swellable spacer fluid and/or between the cement composition and the swellable spacer fluid.

Although the above methods and compositions are described with respect to spacer fluids, those of ordinary skill in the art with the benefit of this disclosure will recognize that embodiments of the swellable spacer fluids of the present invention may be suitable for use in other subterranean applications. By way of example, the swellable spacer fluids may be suitable for use in reducing, or potentially completely blocking, the permeability of a subterranean zone. This may be desirable, for example, to reduce the loss of a fluid from the well bore into the zone. An embodiment for reducing the permeability of a subterranean zone may include introducing a swellable fluid into the subterranean zone from a well bore, and allowing the swellable fluid to form an elastic swellable semi-solid gelatinous material (hydrogel) in the subterranean zone that reduces the permeability of the subterranean zone. Embodiments of the swellable fluid may have the same or similar composition as the above-described swellable spacer fluids. By reducing the permeability of the subterranean zone, the flow of fluids through, or loss of fluids into, the subterranean zone may be reduced.

To facilitate a better understanding of the present invention, the following examples of certain aspects of some embodiments are given. In no way should the following examples be read to limit, or define, the entire scope of the invention.

EXAMPLE 1

To evaluate the use of swellable particles in the above-described crosslinked gels, a base fluid was prepared. The base fluid comprised 91 cc of water, 88 cc of a copolymer of polyacrylamide and an acrylate ester (HZ-10™ polymer, available from Halliburton Energy Services, Inc.), 30.5 cc of an organic gelling agent (HZ-20™ crosslinked, available from Halliburton Energy Services, Inc.), and 24 grams of sodium carbonate for a total volume of 125 cc. To 54 cc of the base fluid, 54 cc of a swellable elastomer was added. The swellable elastomer used in this test was a super absorbent nitric rubber. This combination was then placed in glass jar and allowed to cure overnight at 140° C. to form an elastic swellable semi-solid gelatinous material. After 24 hours, the combination was cut in half, 54 cc, then set in water) the combination swelled to 104 cc based upon water displacement. After 72 hours, 54 cc of the combination swelled to 198 cc, based upon water displacement.

EXAMPLE 2

To further evaluate the use of swellable particles in the above-described crosslinked gels, a base fluid was prepared. The base fluid comprised 91 cc of water, 88 cc of a copolymer of polyacrylamide and an acrylate ester (HZ-10™ polymer, available from Halliburton Energy Services, Inc.), 30.5 cc of an organic gelling agent (HZ-20 (HZ-20™ crosslinked, available from Halliburton Energy Services, Inc.), and 24 grams of sodium carbonate for a total volume of 125 cc. To 125 cc of the base fluid, 125 cc of super absorbent nitrile rubber was added. This combination was then placed in glass jar and allowed to cure for 4 days at 72° C. After 4 days, the combination swelled by 200 cc for a total of 450 cc, based upon water displacement The elastic swellable semi-solid gelatinous material (having a volume of 200 cc) formed by allowing the combination to cure for 4 days was then placed into 400 cc of water. A 400 gram weight was place on top of the gel to hold the elastic swellable semi-solid gelatinous material in the water and to provide a significant resistance to the swelling rubber's ability to absorb water. The swelling of the gel is shown in the table below:

TABLE 1

| Time | Volume | Increase |
| --- | --- | --- |
| 24 hrs | 320 cc | 60% |
| 48 hrs | 356 cc | 78% |
| 96 hrs | 413 cc | 107% |
| 7 days | 470 cc | 135% |
| 25 days | 545 cc | 172% |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A method comprising:
   placing a first fluid in into an annulus between a subterranean formation and a conduit disposed in a well bore,
   then placing a swellable spacer fluid into the annulus between the subterranean formation and the conduit disposed in the well bore, the swellable spacer fluid comprising an aqueous fluid, colloidal silica, and a plurality of swellable particles comprising a swellable elastomer;
   then placing a second fluid into the annulus between the subterranean formation and the conduit disposed in the well bore, such that the swellable spacer fluid is between the second fluid and the first fluid that is disposed in the annulus; and
   allowing the colloidal silica to form a semi-solid, gel structure in the annulus, wherein the semi-solid, gel structure is formed by a reaction of the colloidal silica with urea or lactose.

2. The method of claim 1 wherein the swellable particles swell in the presence of an aqueous fluid, a non-aqueous fluid, or a gas.

3. The method of claim 1 wherein the second fluid comprises a cement composition, and wherein the first fluid comprises a drilling fluid.

4. The method of claim 1 wherein the swellable particles are present in a range from about 5% to about 95% by volume of the swellable spacer fluid.

5. The method of claim 1 wherein the semi-solid, gel structure substantially isolates the second fluid from the first fluid.

* * * * *